Patented Apr. 1, 1947

2,418,431

UNITED STATES PATENT OFFICE 2,418,431

CEMENT COMPOSITION

Edward W. Scripture, Jr., Shaker Heights, Ohio

No Drawing. Application August 13, 1941,
Serial No. 406,723

3 Claims. (Cl. 106—92)

This invention relates to indurating compositions for improving hydraulic cement mixes, such as used for the making of mortar, concrete and the like.

Concrete and mortar are structural materials manufactured during construction operations by mixing together an hydraulic cement and aggregates with sufficient water to form a plastic mass which can be placed in the space to be filled and compacted therein. It is necessary that this structural material shall have certain properties, such as strength, low volume change, relative watertightness or impermeability, etc.

The concrete or mortar hardens and acquires strength through a reaction which is primarily an hydration of the cement compounds, but is more or less complex, between the water and the cement. It is, however, never possible to make a plastic placeable concrete with only sufficient water to hydrate the cement; an excess of water is always required. It is upon the amount of this excess of water that the properties of the concrete are largely dependent. The compressive strength varies inversely with the proportion of the water to the mix. The changes in volume are to a large extent dependent on the amount of excess water. When the excess water leaves the concrete subsequent to hardening, it leaves behind it voids which permit the penetration of water and other liquids.

It may be said that the quality of a concrete or mortar is determined by two properties on which the other properties are dependent. These two properties are the amount of excess water in the concrete and the strength, usually determined in compression. It is perfectly possible to diminish the amount of excess water without increasing the strength, and, in fact, with substantial decreases in strength, or even complete destruction of the strength. This results from the fact that many substances which have a plasticizing effect also interfere with the hydration reactions of the cement. Substances which tend to impair the compressive strength of hydraulic cements obviously should not be used in sufficient amounts in cement mixes to substantially reduce the compressive strength of the structure produced.

It is also perfectly possible to increase the strength of concrete without materially affecting the amount of excess water required for workability. This may be accomplished with various substances which actually react with the cement, such as a pozzuolanic material, or with substances which may be regarded as catalysts, that is, substances which may or may not actually take part in the cement reactions, but which produce effects disproportionately large when compared with the relative amounts of the added substances and the cement. Substances which increase strength without affecting water content of the concrete or mortar are obviously of some utility, since one of the two fundamental properties of the mass is improved. Substances which increase strength, and at the same time increase the water requirements of the concrete, may or may not be useful, depending on the relative importance of strength and water content when the concrete is used for a particular purpose. It will be apparent that the most desirable addition to a concrete or mortar mix is one which will reduce the amount of water required for placeability and at the same time increase the compressive strength.

It is generally accepted that the compressive strength of cement mixes is governed by the so-called "water-cement ratio law," which states that, for workable mixes the compressive strength varies inversely with the ratio of the volume of water used to the volume of cement used (W/C). It is owing to this law, at least in large part, that cement dispersing agents, not in themselves deleterious to the cement, which permit a reduction in water for a given quantity of cement, produce corresponding increases in strength.

If it were possible to increase the compressive strength of the concrete or mortar without reference to the water-cement ratio law, that is, if, for a given cement content, the strength could be increased by the addition of some material, then again it might be possible to derive an economic advantage. It might be that the cost of the added material would be less than the value of the cement which could be saved while still producing the same strength. In such a case, however, when a material was used to increase strength, but without reduction in water, the quality of the concrete would not be improved at the reduced cement content, and might even be impaired. The water-cement ratio would be increased, the volume change would not be materially reduced, if reduced at all, and the mix would be deficient in fine material, and might well become harsh and difficultly placeable even though the consistence were maintained the same.

When, however, a material which increases compressive strength is combined with a material which permits a reduction in water while maintaining workability, then the situation may be altered and an unexpected result secured.

With respect to early ages, a number of materials are known which will increase compressive strength. These materials are known as accelerators, that is, they increase the rate of hydration of the cement and its rate of hardening. Such materials do not, however, affect the strength of the completely hydrated cement so that at the later ages the compressive strengths either are not increased or are decreased. Since the ultimate strength or strength at the later ages is the criterion of the value of concrete or mortar for structural purposes, these accelerators do not offer a solution to the problem of increased strength although they may serve other useful purposes such as that noted above or in facilitating construction and increasing the rate of building.

It is also well known that certain materials, for example pozzuolanas, will increase ultimate strength or strength at later ages. This effect is produced by a chemical reaction between a part of the cement and the pozzuolana forming additional cementitious compounds. The use of these materials suffers from one disadvantage which may be mentioned, and there may be others. The introduction of sufficient pozzuolana into a mix to produce an appreciable increase in strength necessitates the addition of a greater or less amount of water to maintain the same placeable consistency.

Few, if any, substances are known which function in cement mixes with respect to strength at the later ages in a manner similar to the functioning of accelerators with respect to early strengths. Put in another way, few, if any, materials are known which act as catalysts with respect to the strength of cement at the later ages, that is, produce large increases in strength with very small amounts of the added material.

It is an object of the present invention to provide an indurating composition which will increase the strength, hardness and water-resisting qualities of hydraulic cement structures, and which will also improve the plasticity of the cement mixes.

It is another object of this invention to provide an indurating composition which will increase the density and water-resisting qualities of concrete.

It is still another object of this invention to provide an indurating composition which will improve the properties of concrete, mortar, and the like, made from hydraulic cement mixes containing pozzuolanic materials, accelerating agents, dispersing agents, in suitable amounts.

It is a further object of this invention to provide an indurating composition which improves the strength of concrete at later ages.

It is a still further object of the present invention to provide an indurating composition which when added in only small quantities materially improves the strength of concrete at later ages.

These and other objects which will be apparent from the following description of my invention are accomplished by incorporating suitable amounts of sugar or sugars into concrete or mortar mixes.

The mixes contemplated by the present invention comprise in addition to the sugar, an hydraulic cement, such as Portland cement, and fine aggregate, such as sand. Coarse aggregate may or may not be present depending on whether concrete or mortar is desired. Various additional materials, such as cement-dispersing agents, plasticizers, accelerators which accelerate the hardening and setting of the cement, as well as various finely divided filling materials, such as puzzuolanic materials, fly ash, finely ground slag, etc., may also be present in the mix, if desired.

Although it has been the generally accepted opinion of various writers and investigators that sugar has an injurious effect upon the strength of cement, I have found that relatively small proportions of sugar are very desirable and hardened cement and concrete containing small amounts of sugar has greater compressive strength at later ages than has similar hardened material without sugar. The maximum amount of sugars which may be desirable in a cement mix depends to a large extent upon the amount of the other constituents, such as accelerators, plasticizers, etc., present in the mix. In any case, it has been found that as little as .01% sugar, based on the weight of the cement, produces noticeably beneficial effects.

As the amount of accelerator in the mix is increased, the maximum desirable amount of sugar becomes greater. When no accelerator is present, greatest benefit is obtained with less than .15% of sugar, whereas in a cement mix containing substantial amounts of accelerators, as much as .5% of sugar may be present.

In accordance with the present invention, any sugar may be utilized. However, those within the group consisting of monosaccharides, especially the pentoses and hexoses which include glucose and levulose, and disaccharides, including sucrose, maltose, lactose, etc., are preferred. The sugars may be economically obtained from the waste products of the cane or beet sugar industries, or these latter in the unpurified state or in the form of a dried residue may be incorporated directly in the mix.

If sugar is used with cement in suitable proportions, beneficial results may be secured. It is possible to increase the fluidity of the mix for a given water content or conversely to decrease the water required for a given consistency. The compressive strengths are substantially increased. Larger proportions of sugar may be used without impairment of strength at the early ages by use with the sugar of certain compounds, specifically accelerators which accelerate the hardening or setting of the cement.

Sugar may be incorporated into the mix in any suitable manner, such as by mixing the sugar with the water used in preparing the mix or by incorporating it directly with the cement or other ingredients. It is particularly desirable to grind the sugar with the cement or other solid constituents of the mix.

The following table illustrates the effect of small amounts of any sugar in reducing the water required in a mortar mix and in increasing its compressive strength. The mortar consisted of 1 part cement and 3 parts sand, by weight, prepared according to standard procedures.

Table 1

| Per cent Sugar on Weight of Cement | C. c. Water Required | Compressive Strength, Lbs. per Sq. In. | | |
|---|---|---|---|---|
| | | 3 days | 7 days | 28 days |
| None | 500 | 1,465 | 2,958 | 4,103 |
| .01 | 490 | 1,622 | 2,990 | 4,644 |
| .10 | 480 | 1,846 | 3,276 | 5,184 |
| .20 | 475 | 1,680 | 3,340 | 4,580 |

When the quantity of sugar in the above mix was increased to .5% or 1%, based on the weight of the cement, the compressive strength of the 2" by 4" cylindrical specimens was substantially zero.

The following table illustrates the effects obtained with both sugar and an accelerator, such as calcium chloride, in the mix:

Table 2

| Per cent Sugar on Weight of Cement | Per cent Calcium Chloride on Weight of Cement | C. c. Water Required | Compressive Strength, Lbs. per Sq. In. | | |
|---|---|---|---|---|---|
| | | | 3 days | 7 days | 28 days |
| None | None | 553 | 2,385 | 4,010 | 4,390 |
| .05 | .5 | 516 | 3,245 | 4,425 | 5,445 |
| .075 | .5 | 507 | 3,340 | 4,295 | 5,125 |
| .10 | .5 | 503 | 3,215 | 3,375 | 4,170 |

In concrete mixes I have observed similar effects. For example, mixtures of 30 lbs. cement, 90 lbs. sand and 133 lbs. crushed stone (¾″) were made with and without sugar, using sufficient water to bring all the mixes to the same consistency as measured by the slump test. Cylinders, 6″ by 12″, were made from these mixes, cured, and tested in compression by standard methods. The results of these tests are shown in the following table:

Table 3

| Sugar, Added, Per cent by Weight of Cement | Water Added, Lbs. | Slump, Inches | Compressive Strength, Lbs. per Sq. In. | | |
|---|---|---|---|---|---|
| | | | 3 days | 7 days | 28 days |
| None | 22.47 | 2¾ | 1,520 | 2,415 | 2,800 |
| .01 | 21.36 | 2¾ | 1,645 | 3,020 | 3,490 |
| .05 | 20.63 | 2¾ | 2,015 | 3,235 | 3,760 |
| .075 | 20.16 | 3 | 2,025 | 3,305 | 3,910 |

It will be apparent that the addition of small amounts of sugar has permitted a reduction in the water required for a given consistency in a given mix and has produced substantial increases in compressive strength. These effects are more marked with increasing amounts of sugar within a range up to the point where the hardening of the cement is seriously impaired.

As mentioned above, sugar may be utilized in a mix containing suitable accelerators for cement, which accelerate the hardening or setting of the cement. Since a larger proportion of sugar may be utilized when a large amount of accelerator is present, it is preferable that the sugar, with or without suitable finely divided inert filler, be mixed with the accelerator to provide an indurating composition for addition to hydraulic cement mixes. Such a composition has as its chief active constituents sugar and accelerator in the desired proportion. The ingredients may be packaged in suitable containers for addition to cement, mortar and concrete mixes. The sugar should preferably be present in such a hardening composition in the amount of 5% to 35% of the accelerator, such as a soluble metal chloride. Preferred results are obtained, however, when the sugar is present in the amount of 10% to 30% of the calcium chloride.

In order to illustrate the effect of sugar in combination with the accelerator, two indurating compositions of the following compositions were prepared:

Composition "A": Parts by weight
Sugar ------------------------------- 75
Calcium chloride --------------------- 500
Composition "B":
Sugar ------------------------------- 15
Calcium chloride --------------------- 50

Three separate batches containing 30 lbs. of cement, 90 lbs. of sand, and 133 lbs. of crushed stone (three-fourths inch) were prepared. One of these batches was mixed with .57 lb. of Composition A per sack of cement, and another batch was mixed with the same amount of Composition B. The third batch contained no addition. Each of these batches was then mixed with sufficient water to obtain substantially the same plasticity. The amount of water used and the compressive strengths obtained are shown by the following table:

Table 4

| Additions | Water, Lbs. | Slump, Inches | Compressive Strength, Lbs. per Sq. In. | | |
|---|---|---|---|---|---|
| | | | 3 days | 7 days | 28 days |
| None | 20.75 | 3 | 1,240 | 2,190 | 3,040 |
| Composition A, .575# per sack of cement | 19.38 | 3 | 2,590 | 3,650 | 4,080 |
| Composition B | 18.69 | 2¾ | 1,720 | 3,250 | 4,210 |

Again it will be apparent that these sugar compositions will permit a reduction of water without decreased fluidity in a concrete mix and will increase compressive strength. By the use of an accelerator with the sugar it is possible to use a larger proportion of sugar on the weight of cement and thereby secure larger effects without seriously impairing the early strengths and hardening properties of the cement.

Suitable accelerators, which may be substituted for calcium chloride above include soluble electrolytes such as calcium chloride, a sodium silicate and the soluble alkali silicates, triethanolamine, etc. A similar objective may also be accomplished by reducing the proportion of retarder, calcium sulphate, commonly employed in Portland cement. I commonly employ an amount of accelerator between 0.5% and 2.0% of the weight of the cement, but the proportions may obviously be varied, either higher or lower, depending on the particular accelerator selected, the degree of acceleration required and the proportion of sugar employed. By the term sugar I mean the ordinary cane sugar, beet sugar and the various common sugars such as dextrose, maltose, levulose, etc., as well as the more complex carbohydrates of the sugar type such as sorbitol, including pentoses, hexoses, etc.

Furthermore, it is to be understood that the particular form of product shown and described, and the particular procedure set forth, are presented for purposes of explanation and illustration and that various modifications of said product and procedure can be made without departing from my invention as defined in the appended claims.

What I claim is:

1. A concrete or mortar mix for making structural concrete and the like, consisting of an hydraulic cement of the Portland type, a strengthening and plasticizing agent comprising sugar in an amount of from .01% to .5% of the weight of the cement in the mix, and calcium chloride in an amount from .5% to 2% of the weight of the cement, the balance being substantially entirely inert aggregate and water.

2. A concrete or mortar mix for making structural concrete and the like, consisting of an hydraulic cement of the Portland type, a strengthening and plasticizing agent comprising sugar in an amount up to .5% of the weight of the cement in the mix, and calcium chloride in an amount from .5% to 2% of the weight of the cement, the sugar being always present in the amount of 5% to 30% of the calcium chloride, the balance being substantially entirely inert aggregate and water.

3. A concrete or mortar mix for making structural concrete and the like, consisting of an hydraulic cement of the Portland type, a strengthening and plasticizing agent comprising sugar in an amount up to .3% of the weight of the cement in the mix, and calcium chloride in an amount from .5% to 2% of the weight of the cement, the balance being substantially entirely inert aggregate and water.

EDWARD W. SCRIPTURE, JR.

REFERENCES CITED

The following references are of record in the file of this patent:

UNITED STATES PATENTS

| Number | Name | Date |
|---|---|---|
| 2,234,191 | Olze | Mar. 11, 1941 |
| 509,822 | Pierce | Nov. 28, 1893 |
| 2,229,311 | Scripture, Jr. | Jan. 21, 1941 |

FOREIGN PATENTS

| Number | Country | Date |
|---|---|---|
| 54,590 | Swedish | 1923 |
| 436,105 | British | 1935 |
| 480,681 | British | 1938 |